(12) United States Patent
Kuo et al.

(10) Patent No.: US 8,833,998 B2
(45) Date of Patent: Sep. 16, 2014

(54) BACKLIGHT MODULE FOR PROVIDING LIGHT TO A DISPLAY PANEL AND DISPLAY DEVICE THEREWITH

(75) Inventors: Ying-Te Kuo, New Taipei (TW); Jyun-Sheng Syu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 182 days.

(21) Appl. No.: 13/597,276

(22) Filed: Aug. 29, 2012

(65) Prior Publication Data

US 2013/0141936 A1 Jun. 6, 2013

(30) Foreign Application Priority Data

Dec. 5, 2011 (TW) .............................. 100144729 A

(51) Int. Cl.
*F21V 7/04* (2006.01)

(52) U.S. Cl.
USPC ............................ 362/606; 362/607; 362/617

(58) Field of Classification Search
CPC .... G02B 6/0001; G02B 6/0033; G02B 6/005; G02B 6/0051; F21V 29/002; F21V 29/004; F21V 29/20; F21V 29/22; F21V 29/2206; F21V 29/2212; G02F 1/133615
USPC ......... 362/606, 607, 612, 613, 615, 617–619, 362/294, 373
See application file for complete search history.

(56) References Cited

U.S. PATENT DOCUMENTS

| | | | |
|---|---|---|---|
| 7,220,040 B2 | 5/2007 | Lengyel | |
| 7,710,514 B2 | 5/2010 | Choi | |
| 2007/0268723 A1* | 11/2007 | Weng et al. | 362/633 |
| 2010/0188607 A1 | 7/2010 | Park | |

FOREIGN PATENT DOCUMENTS

| | | |
|---|---|---|
| CN | 1892313 A | 1/2007 |
| TW | 201037420 | 10/2010 |

OTHER PUBLICATIONS

Office action mailed on May 27, 2014 for the Taiwan application No. 100144729, filing date: Dec. 5, 2011, p. 1 line 11~14, p. 2~3 and p. 4 line 1~20 Translation.

* cited by examiner

*Primary Examiner* — Thomas Sember
(74) *Attorney, Agent, or Firm* — Winston Hsu; Scott Margo

(57) ABSTRACT

A backlight module includes a light emitting unit for emitting light, a light guide plate disposed on a side of a display panel for guiding the light emitted by the light emitting unit to the display panel, a back cover installed outside the light emitting unit and the light guide plate, and a frame combined with the back cover for accommodating the light emitting unit and the light guide plate with the back cover. The frame includes a first side facing a surface of the light guide plate, and a second side opposite to the first side. The backlight module further includes an optical material layer disposed between the second side of the frame and the display panel for misting and focusing the light refracted from the light guide plate so as to provide uniform and bright light to the display panel.

17 Claims, 4 Drawing Sheets

BACKLIGHT MODULE FOR PROVIDING LIGHT TO A DISPLAY PANEL AND DISPLAY DEVICE THEREWITH

BACKGROUND OF THE INVENTION

1. Field of the Invention

The present invention relates to a backlight module for providing light to a display panel and a display device therewith, and more particularly, to a backlight module with an optical material layer disposed between a frame and a display panel, and a display device therewith.

2. Description of the Prior Art

With development of technology, a portable electronic device with thin design, less power consumption and portability has been more and more popular in daily life, and a display panel plays an important role therein. Since a liquid crystal display device has advantages of thin shape, less power consumption and non-radiation, it has been widely implemented in the portable electronic device, such as a notebook computer, a personal digital assistant, a cell phone and so on, it has possessed a great market share in the consumer electronic product market. Accordingly, it has been a trend to replace a CRT of a desktop PC and a traditional television. Generally speaking, the backlight modules can be divided into an edge-type backlight module and a direct-type backlight module. Since the edge-type backlight module has a design on lateral light emission and has advantages of light weight, thin shape and low power consumption, it has become a critical component of a screen implemented in the cell phone, the personal digital assistant and the notebook computer.

In design of a conventional backlight module, a distance of two adjacent light emitting diodes is represented as P, and a distance between an illuminating surface of the light emitting diode and an active area AA of the display panel projecting to a light guide plate is represented as A. The ratio of A/P plays a critical role in image quality. In general, the larger the ratio of A/P is, the better the image quality will be. Conversely, the smaller the ratio of A/P is, the worse the image quality will be. In other words, in the situation of the high ratio of A/P, the light guide plate can provide more uniform light to the active area AA, while in the situation of the low ratio of A/P, non-uniform light on the active area AA provided by the light guide plate may occur, so as to result in hot spots. Accordingly, the image quality is reduced. In consideration of cost, power consumption, heat dissipation, environmental protection and so on, an amount of the light emitting diodes is required to decrease. As a result, in presupposition of not changing dimensions of the panel, the distance of two adjacent light emitting diodes P increases correspondingly. However, the distance A, which is between the illuminating surface of the light emitting diode and the active area AA of the display panel projecting to the light guide plate, can not increase due to structural limitation. As a result, the ratio of A/P can not be enhanced resulting in decrease of the image quality. On the other hand, the increased distance A can not meet requirement of thin rim design.

Furthermore, in assembly of the conventional liquid crystal display device, an optical material layer for misting and focusing the light is installed on a top surface of the light guide plate, and a plastic frame is used for pressing the optical material layer onto the light guide plate. Since the optical material layer contacts the light guide plate directly, scratches often occur on the optical material layer and/or the light guide plate. Furthermore, since the optical material layer is directly covered with the light guide plate, the light emitted from the light emitting unit focuses inwardly by prism effect, so as to make hot spot stand out. In order to cover the hot spot, a covering area of the plastic frame needs to overlap with the active area AA of the display panel. As a result, it can not meet the requirement of thin rim design. Furthermore, the conventional design utilizes the plastic frame to press and fix the assembly of the optical material layer and the light guide plate. Accordingly, it is necessary to detach the plastic frame as replacing the optical material layer, so as to increase labor hours and result in inconvenience of assembly. Therefore, how to provide a liquid crystal display device with a high assembly yield and convenience of assembly to meet the requirement of a thin size, such as the thin rim design, has become an issue of mechanical design for the consumer products in the market.

SUMMARY OF THE INVENTION

The present invention provides a backlight module with an optical material layer disposed between a frame and a display panel, and a display device therewith for solving above drawbacks.

According to the claimed invention, a backlight module for providing light to a display panel includes a light emitting unit, a light guide plate, a back cover, a frame and an optical material layer. The light emitting unit is for emitting light. The light guide plate is disposed on a side of the display panel for guiding the light emitted from the light emitting unit to the display panel. The back cover is installed outside the light emitting unit and the light guide plate. The frame is combined with the back cover for accommodating the light emitting unit and the light guide plate with the back cover. The frame includes a first side and a second side opposite to the first side, and the first side faces a surface of the light guide plate. The optical material layer is disposed between the second side of the frame and the display panel for misting and focusing the light refracted from the light guide plate.

According to the claimed invention, an end of the frame is substantially aligned with a periphery of a visible area of the display panel.

According to the claimed invention, the frame supports the optical material layer above the light guide plate, so as to form a gap between the optical material layer and the light guide plate.

According to the claimed invention, the gap is substantially between 0.5 mm and 2 mm.

According to the claimed invention, the light emitting unit is disposed on a lateral side of the light guide plate.

According to the claimed invention, the light emitting unit is a light emitting diode strip.

According to the claimed invention, the backlight module further includes a thermal fin disposed on an inner side of the back cover for dissipating heat generated by the light emitting unit.

According to the claimed invention, a display device includes a display panel and a backlight module for providing light to the display panel. The backlight module includes a light emitting unit, a light guide plate, a back cover, a frame and an optical material layer. The light emitting unit is for emitting light. The light guide plate is disposed on a side of the display panel for guiding the light emitted from the light emitting unit to the display panel. The back cover is installed outside the light emitting unit and the light guide plate. The frame is combined with the back cover for accommodating the light emitting unit and the light guide plate with the back cover. The frame includes a first side and a second side opposite to the first side, and the first side faces a surface of the light guide plate. The optical material layer is disposed between the second side of the frame and the display panel for misting and focusing the light refracted from the light guide plate.

Since the optical material layer of the present invention is disposed between the frame and the display panel, the optical material layer of the present invention does not contact the light guide plate directly. Accordingly, it can prevent the optical material layer from scratching the light guide plate. Furthermore, since the optical material layer is disposed above the frame instead of being covered on the light guide plate, part of the light emitted from the light emitting unit will be absorbed by the frame. Further, since there is air between the optical material layer and the light guide plate, it can prevent hot spots resulting from prism effect of the light emitted from the light emitting unit in the prior art. In such a manner, there is no need to dispose additional micro-structures on the light guide plate for making the light guide plate illuminate uniformly. Accordingly, it can reduce manufacture cost. Since the hot spot issue can be solved, the end of the frame can be designed to be aligned with a boundary of the active area of the display panel without overlapping. As a result, it can be implemented in the thin rim design. Since the stacking structure of the optical material layer of the present invention solves the hot spot issue, the present invention does not need to be constrained by the conventional A/P ratio. In other words, if the amount of the light emitting diodes of the light emitting unit is curtailed in consideration of cost, power consumption, heat dissipation and environment protection, the gap between the two adjacent light emitting diodes of the light emitting unit increases. Since the present invention is not constrained by the conventional A/P ratio, there is no need to increase the distance between the illuminating surface of the light emitting diode and the boundary of the active area. In such a manner, it can be implemented in the thin rim design. Furthermore, the optical material layer is disposed above the frame instead of utilizing the plastic frame to press and fix the optical material layer and the light guide plate. Accordingly, it is not required to detach the frame as the optical material layer needs to be reworked for replacement, so as to reduce labor hours and increase convenience of assembly. In summary, the present invention is capable of providing a liquid crystal display device with high assembly yield and convenience of assembly to meet the requirements of a thin size, such as the thin rim design, as well as good image quality for the consumer products in the market.

These and other objectives of the present invention will no doubt become obvious to those of ordinary skill in the art after reading the following detailed description of the embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
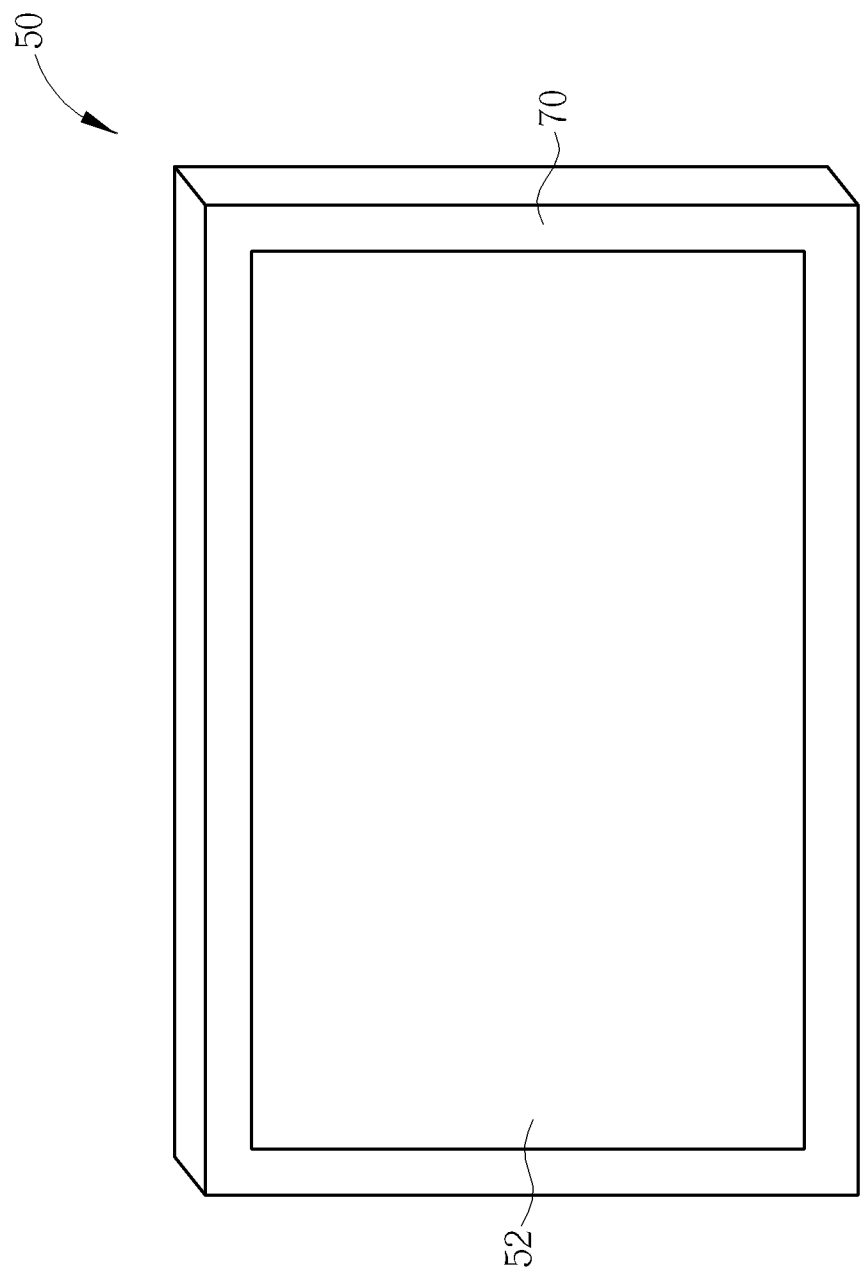
FIG. 1 to FIG. 3 are respectively a schematic diagram, an exploded diagram and a sectional diagram of a display device according to an embodiment of the present invention.
Figure 2:
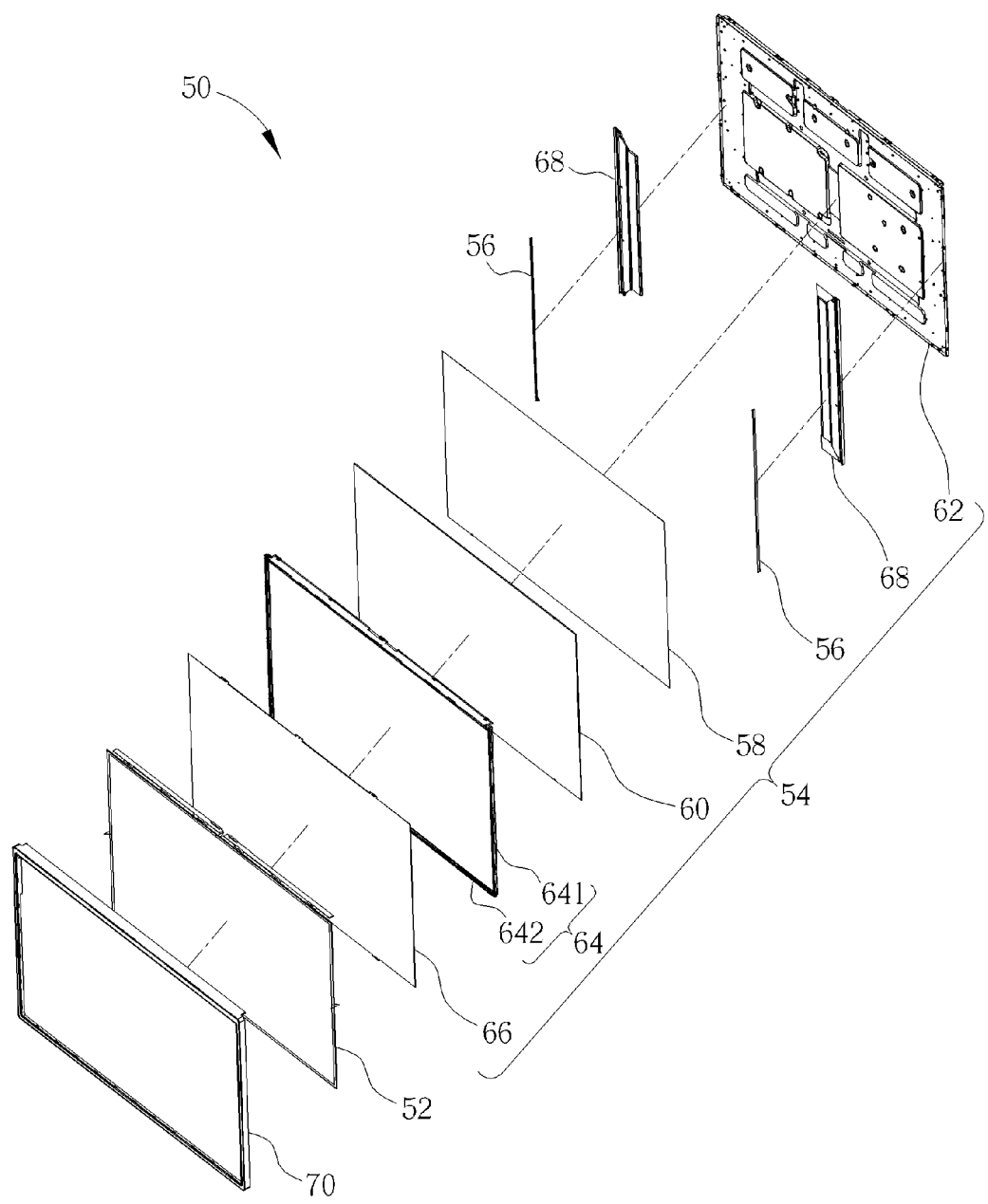
Figure 3:
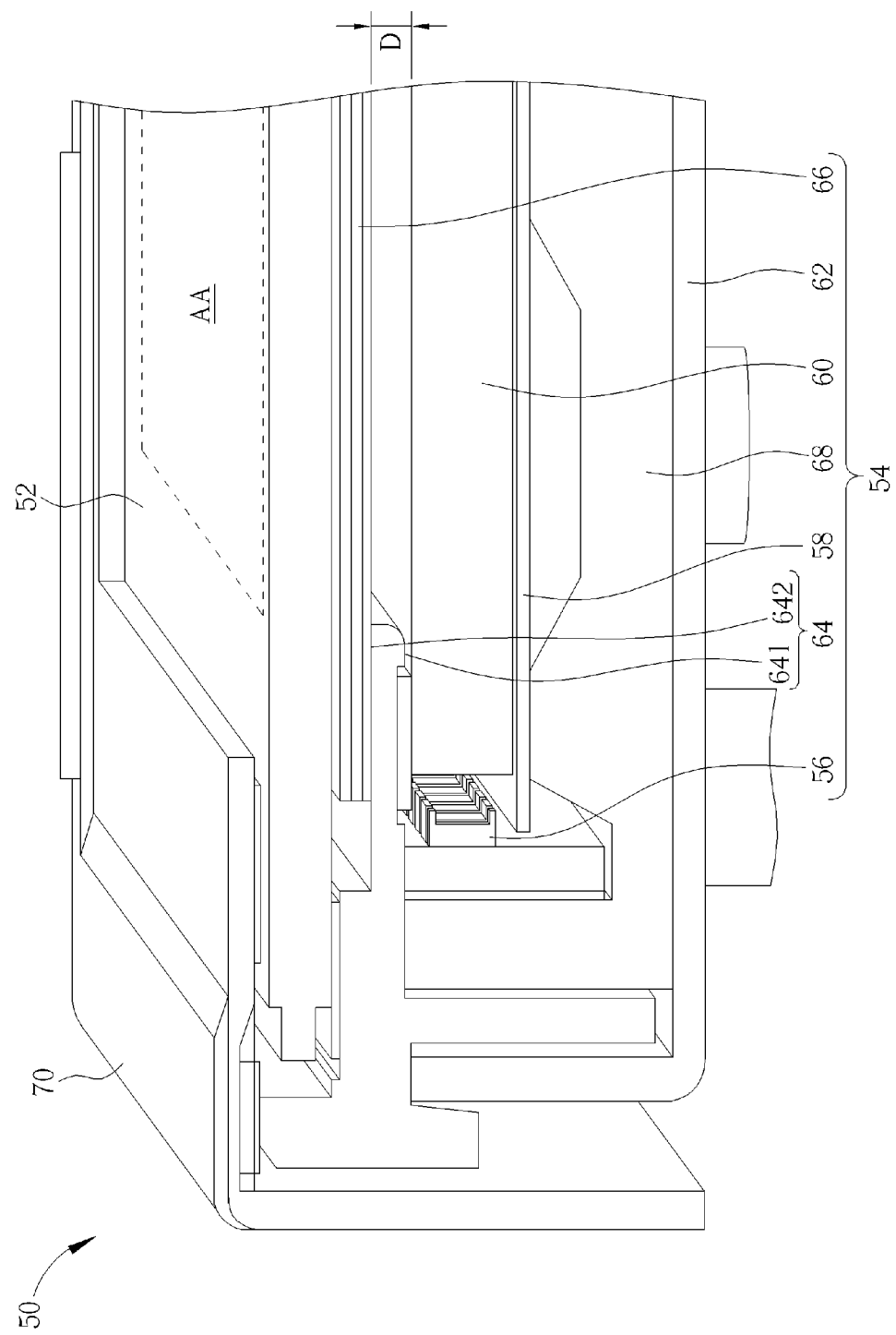

Please refer to FIG. 1 to FIG. 3. FIG. 1 to FIG. 3 are respectively a schematic diagram, an exploded diagram and a sectional diagram of a display device 50 according to an embodiment of the present invention. The display device 50 can be a liquid crystal display device or a liquid crystal display monitor implemented in a notebook computer. The display device 50 includes a display panel 52 which can be a liquid crystal display panel. The display device 50 further includes a backlight module 54 for providing light to the display panel 52. The backlight module 54 includes at least one light emitting unit 56, a reflective plate 58, a light guide plate 60, a back cover 62, a frame 64, an optical material layer 66 and at least one thermal fin 68. The light emitting unit 56 is used for emitting light. In this embodiment, the backlight module 54 can be an edge-typed backlight module, and the light emitting unit 56 can be a light emitting diode strip. The backlight module 54 can include two light emitting diode strips disposed on two lateral sides of the light guide plate 60. The light emitting unit 56 also can be a cold cathode fluorescent lamp (CCFL), and so on. An amount, categories and disposal position of the light emitting unit 56 are not limited to those mentioned in this embodiment, and it depends on practical demands. The light guide plate 60 is disposed on a side of the display panel 52 for guiding the light emitted from the light emitting unit 56 to the display panel 52. The reflective plate 58 is disposed below the light guide plate 60 for reflecting the light passing through the light guide plate 60 to the light guide plate 60, so as to enhance the utilization rate of the light.

The back cover 62 is installed outside the light emitting unit 56, the reflective plate 58, the light guide plate 60, the optical material layer 66 and the thermal fin 68, and the frame 64 is combined with the back cover 62. A chamber is formed between the frame 64 and the back cover 62 for accommodating the light emitting unit 56, the reflective plate 58, the light guide plate 60 and the thermal fin 68. The frame 64 has a first side 641 and a second side 642 opposite to the first side 641. The first side 641 faces a surface of the light guide plate 60, and the second side 642 faces the optical material layer 66. In this embodiment, the frame 64 can be a plastic frame. The optical material layer 66 is disposed between the second side 642 of the frame 64 and the display panel 52 for misting and focusing the light refracted from the light guide plate 60. The optical material layer 66 can be a combination of optical films including a prism, a brightness enhancement film, a diffusion sheet and so on, for providing the display panel 52 with more uniform and high brightness light. The thermal fin 68 is disposed on an inner side of the back cover 62 for dissipating heat generated by the light emitting unit 56, so as to enhance efficiency of heat dissipation. The display device 50 further includes a bezel 70 installed on an outer side of the display panel 52 for fixing the display panel 52 on the frame 64. The bezel 70 can cover the display panel 52 and the backlight module 54 cooperatively with the back cover 62. In this embodiment, the bezel 70 and the back cover 62 can be, but no limited to, made in metal materials, such as aluminum alloy, aluminum magnesium alloy and so on. The bezel 70 and the back cover 62 can be made in plastic materials as well. As for which one of the aforesaid designs is adopted, it depends on practical demands.

As shown in FIG. 3, the frame 64 supports the optical material layer 66 above the light guide plate 60, so as to form a gap D between the optical material layer 66 and the light guide plate 60. In this embodiment, the gap D can be between 0.5 mm and 2 mm. Since the optical material layer 66 does not contact the light guide plate 60 directly, it can prevent the optical material layer 66 from scratching the light guide plate 60. Furthermore, since the optical material layer 66 is disposed above the frame 64 instead of being covered on the light guide plate 60, part of the light emitted from the light emitting unit 56 will be absorbed by the frame 64. Further, since there is air between the optical material layer 66 and the light guide plate 60, it can prevent hot spot resulting from prism effect of the light emitted from the light emitting unit in the prior art. In such a manner, there is no need to dispose additional micro-structures on the light guide plate 60 for making the light guide plate 60 illuminate uniformly. Accordingly, it can reduce manufacture cost. Since the hot spot issue can be solved, an end of the frame 64 can be designed to be aligned with a boundary of an active area AA of the display panel 52 without overlapping. As a result, it can be implemented in a thin rim design. In practical, a width of the bezel 70 can be curtailed by one third of a width of the bezel in prior art.

Figure 4:
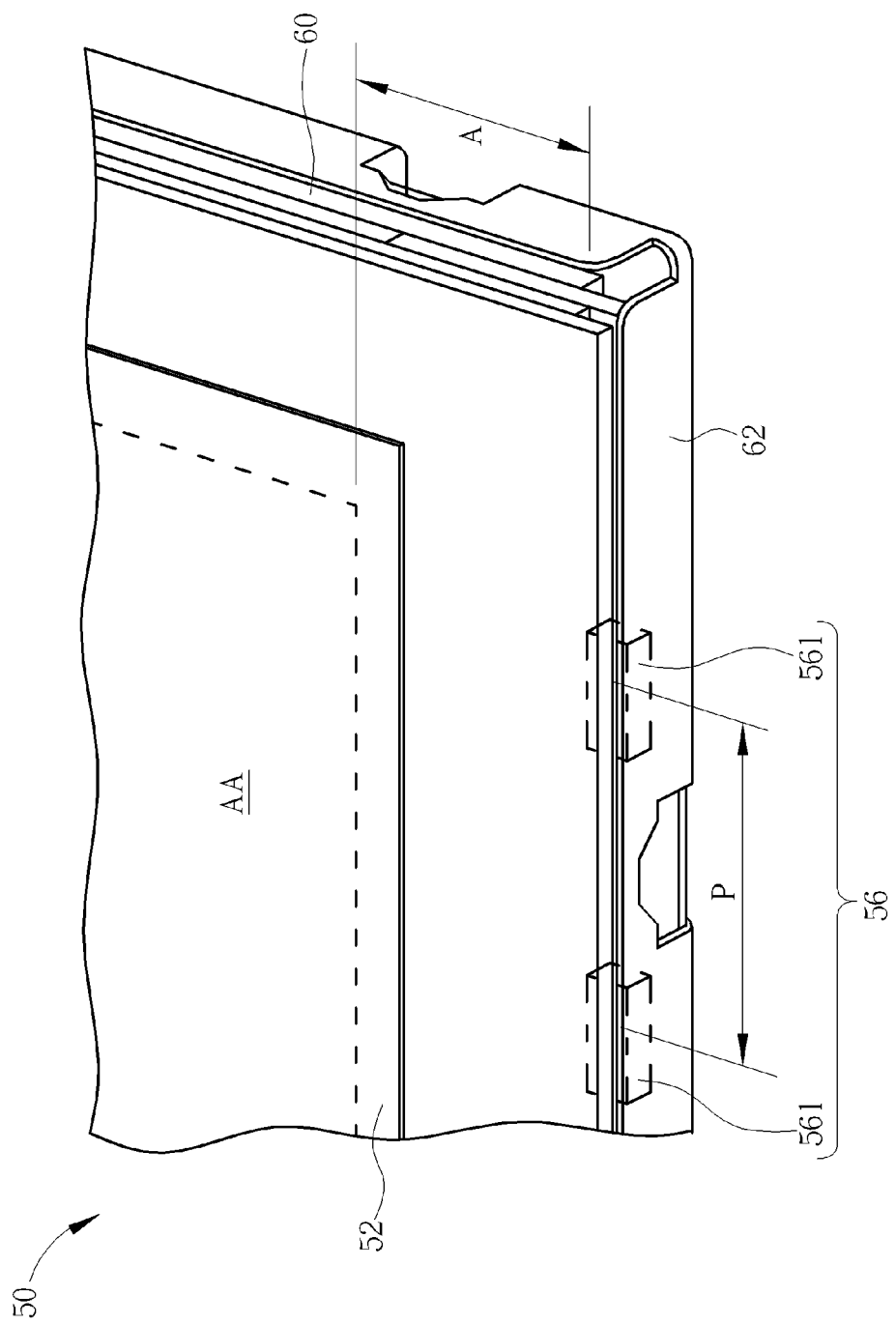
FIG. 4 is a partial diagram of the display device according to the embodiment of the present invention.

In addition, please refer to FIG. 4. FIG. 4 is a partial diagram of the display device 50 according to the embodiment of the present invention. A portion of related parts is omitted for simplicity. In the display device 50, a gap between the two adjacent light emitting diodes 561 of the light emitting unit 56 is represented as P, and a distance between an illuminating surface of the light emitting diode 56 and the active area AA of the display panel 52 projecting to the light guide plate 60 is represented as A. Since the stacking structure of the optical material layer 66 of the present invention solves the hot spot issue, the present invention does not need to be constrained by the conventional A/P ratio. In other words, if an amount of the light emitting diodes 561 of the light emitting unit 56 is curtailed in consideration of cost, power consumption, heat dissipation and environment protection, the gap P between the two adjacent light emitting diodes 561 of the light emitting unit 56 increases. Since the present invention is not constrained by the conventional A/P ratio, there is no need to increase the distance A between the illuminating surface of the light emitting diode 56 and the boundary of the active area AA. In such a manner, it can be implemented in the thin rim design. Furthermore, the optical material layer 66 is disposed above the frame 64 instead of utilizing the plastic frame to press and fix the optical material layer and the light guide plate. Accordingly, it is not required to detach the frame 64 as the optical material layer 66 needs to be reworked for replacement, so as to reduce labor hours and increase convenience of assembly.

Compared to the prior art, since the optical material layer of the present invention is disposed between the frame and the display panel, the optical material layer of the present invention does not contact the light guide plate directly. Accordingly, it can prevent the optical material layer from scratching the light guide plate. Furthermore, since the optical material layer is disposed above the frame instead of being covered on the light guide plate, part of the light emitted from the light emitting unit will be absorbed by the frame. Further, since there is air between the optical material layer and the light guide plate, it can prevent hot spots resulting from prism effect of the light emitted from the light emitting unit in the prior art. In such a manner, there is no need to dispose additional micro-structures on the light guide plate for making the light guide plate illuminate uniformly. Accordingly, it can reduce manufacture cost. Since the hot spot issue can be solved, the end of the frame can be designed to be aligned with a boundary of the active area of the display panel without overlapping. As a result, it can be implemented in the thin rim design. Since the stacking structure of the optical material layer of the present invention solves the hot spot issue, the present invention does not need to be constrained by the conventional A/P ratio. In other words, if the amount of the light emitting diodes of the light emitting unit is curtailed in consideration of cost, power consumption, heat dissipation and environment protection, the gap between the two adjacent light emitting diodes of the light emitting unit increases. Since the present invention is not constrained by the conventional A/P ratio, there is no need to increase the distance between the illuminating surface of the light emitting diode and the boundary of the active area. In such a manner, it can be implemented in the thin rim design. Furthermore, the optical material layer is disposed above the frame instead of utilizing the plastic frame to press and fix the optical material layer and the light guide plate. Accordingly, it is not required to detach the frame as the optical material layer needs to be reworked for replacement, so as to reduce labor hours and increase convenience of assembly. In summary, the present invention is capable of providing a liquid crystal display device with high assembly yield and convenience of assembly to meet the requirement of a thin size, such as the thin rim design, as well as good image quality for the consumer products in the market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module for providing light to a display panel, the backlight module comprising:
    a light emitting unit for emitting light;
    a light guide plate disposed on a side of the display panel for guiding the light emitted from the light emitting unit to the display panel;
    a back cover installed outside the light emitting unit and the light guide plate;
    a frame combined with the back cover for accommodating the light emitting unit and the light guide plate with the back cover, the frame comprising a first side and a second side opposite to the first side, the first side facing a surface of the light guide plate; and
    an optical material layer disposed between the second side of the frame and the display panel for misting and focusing the light refracted from the light guide plate.

2. The backlight module of claim 1, wherein an end of the frame is substantially aligned with a periphery of a visible area of the display panel.

3. The backlight module of claim 1, wherein the frame supports the optical material layer above the light guide plate, so as to form a gap between the optical material layer and the light guide plate.

4. The backlight module of claim 3, wherein the gap is substantially between 0.5 mm and 2 mm.

5. The backlight module of claim 1, wherein the light emitting unit is disposed on a lateral side of the light guide plate.

6. The backlight module of claim 5, wherein the light emitting unit is a light emitting diode strip.

7. The backlight module of claim 1, wherein the light emitting unit is a light emitting diode strip.

8. The backlight module of claim 1, further comprising a thermal fin disposed on an inner side of the back cover for dissipating heat generated by the light emitting unit.

9. A display device, comprising:
a display panel; and
a backlight module for providing light to the display panel, the backlight module comprising:
  a light emitting unit for emitting light;
  a light guide plate disposed on a side of the display panel for guiding the light emitted from the light emitting unit to the display panel;
  a back cover installed outside the light emitting unit and the light guide plate;
  a frame combined with the back cover for accommodating the light emitting unit and the light guide plate with the back cover, the frame comprising a first side and a second side opposite to the first side, the first side facing a surface of the light guide plate; and
  an optical material layer disposed between the second side of the frame and the display panel for misting and focusing the light refracted from the light guide plate.

10. The display device of claim 9, wherein an end of the frame is substantially aligned with a periphery of a visible area of the display panel.

11. The display device of claim 9, wherein the frame supports the optical material layer above the light guide plate, so as to form a gap between the optical material layer and the light guide plate.

12. The display device of claim 11, wherein the gap is substantially between 0.5 mm and 2 mm.

13. The display device of claim 9, wherein the light emitting unit is disposed on a lateral side of the light guide plate.

14. The display device of claim 13, wherein the light emitting unit is a light emitting diode strip.

15. The display device of claim 9, wherein the light emitting unit is a light emitting diode strip.

16. The display device of claim 9, wherein the backlight module further comprises a thermal fin disposed on an inner side of the back cover for dissipating heat generated by the light emitting unit.

17. The display device of claim 9, further comprising a bezel installed on an outer side of the display panel for fixing the display panel on the frame.

\* \* \* \* \*